Patented Jan. 13, 1953

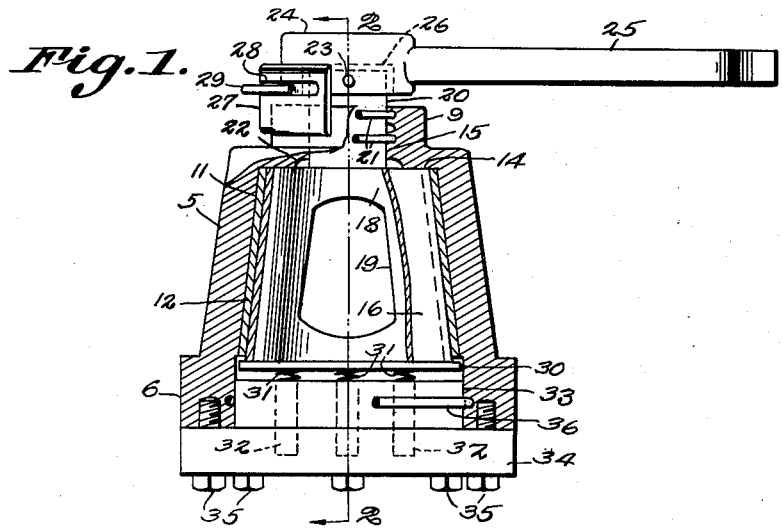
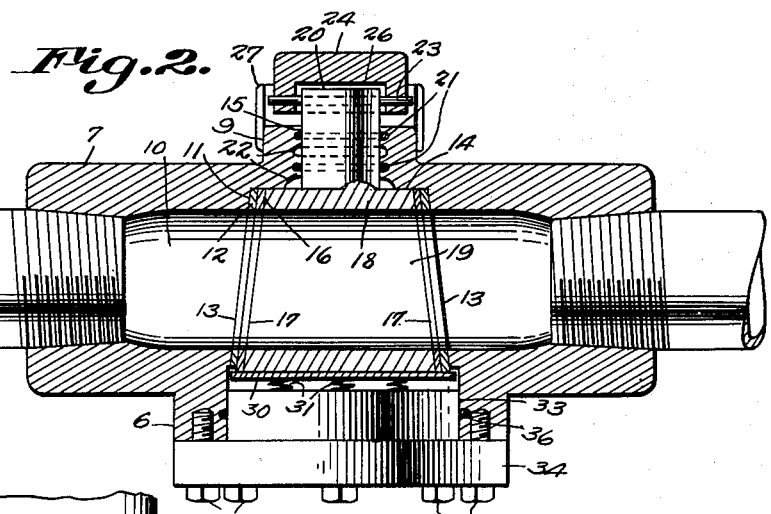
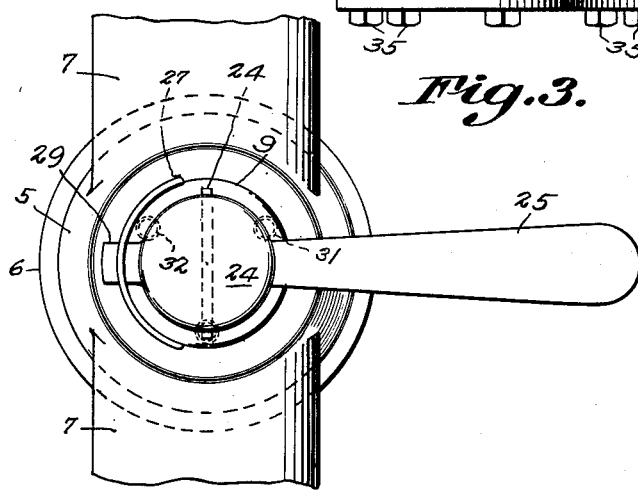

2,625,363

UNITED STATES PATENT OFFICE 2,625,363

AXIALLY MOVABLE PLUG VALVE

Benjamin Frank Waldron, Brookhaven, Miss.

Application April 5, 1949, Serial No. 85,505

1 Claim. (Cl. 251—97)

This invention relates to a stop cock or valve.

An important object of the present invention is to provide a structure of the character described that will include a novelly formed and arranged valve wrench and valve core, so formed and arranged relative to a cooperating valve body as to provide an improved action in opening and closing of the valve.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is a view partly in elevation and partly in vertical section through the valve of the invention.

Fig. 2 is a section on line 2—2 of Fig. 1.

Fig. 3 is a top plan view.

Referring to the drawings in detail, I provide a hollow valve body 5 of tapered or frusto-conical formation integrally formed at its lower end with the depending cylindrical extension 6 and with the lateral extensions 7 for connection to pipes 8. The valve body is also formed with the neck 9 at its upper end. The bores 10 of the lateral extensions 7 are in communication with the tapered valve chamber 11 of the valve body, and the wall of said valve chamber 11 is protected by the tapered sleeve or bushing 12 having the diametrically opposite openings 13 in communication with the bores 10.

Formed at the upper end of the valve chamber 11 is the annular shoulder 14 defined between said chamber and the reduced bore 15 of the neck 9.

A bushing 16 is provided with the diametrically opposite openings 17 adapted to register in one position with the openings 13 of the first bushing, said bushing 16 being mounted upon the rotatable valve core 18 comprising a solid body formed with a transverse bore 19. The bushing 16, having a tight fit upon the valve core, is rotatable therewith and thus is in slidable contact with the stationary bushing 11 of the valve body.

Formed integral with the valve core 18 and extending upwardly from the upper end of said valve core is the stem 20 that projects upwardly through and is rotatable in the reduced bore 15 of neck 9. Sealing rings 21 can be provided to prevent leakage through said bore 15, and I also provide the lubrication recesses 22.

The upper end of the stem 20 projects out of the neck 9 and is provided with the transversely extended hinge pin 23 the ends of which extend through the head 24 of a valve wrench 25, said head 24 being provided with the bottom recess 26 receiving the stem 20. Said recess 26, as clearly shown in Fig. 2, is of a size sufficient to permit valve wrench 25 pivotal movement upon the hinge pin 23.

Welded or otherwise fixedly connected to the neck 9 and upwardly extending therefrom is the arcuate plate or bracket 27 formed with the elongated slot 28 into which extends the short tongue 29 formed integrally with the head 24 of the valve wrench. Tongue 29 has a fit in the slot that will be sufficiently loose as to cause the valve wrench to pivot or fulcrum on said tongue 29 when pressed downwardly.

The valve core 17 is supported upon and rotatable on a disc 30 pressed upwardly against the bottom of the valve core by a plurality of springs 31 disposed in recesses 32 that are formed in the cylindrical upper extension 33 of a closure plate 34 secured to the bottom of the lower portion 6 by screws 35 or the like. A sealing ring 36 is employed to prevent leakage through the bottom of the structure.

In operation, it will be understood that the transverse bore of the valve core and the openings in the respective bushings can all be brought into one position of the valve core, so as to permit the flow of fluid through the structure. Assuming that it is desired to close the valve, the user presses downwardly upon the handle of the wrench 25, causing the wrench to pivot upon the tongue 29 thus to force the valve core downwardly against the action of the springs 31. As a result, the bushing 16 of the valve core is in effect broken loose from the tapered bushing 12 of the valve body, and the user then rotates the valve wrench 25 through ninety degrees to position the openings out of register, thus to stop the flow of fluid through the valve.

To return the valve to open position, the same operation is repeated, in reverse.

What is claimed is:

In a valve a valve body having aligned ports opening thereinto and a frusto-conical valve chamber lying perpendicular to and communicating with the ports, said valve chamber opening at its larger end through the valve body, said valve body also having a valve stem receiving opening extending therethrough and communicating with the valve chamber at the smaller end thereof, a frusto-conical valve seat fitted in the valve chamber and having openings extending therethrough which align with the ports, a frustoconical turning plug mounted in the valve seat for rotation about an axis which lies perpendicular to the ports, said turning plug having a passage extending transversely therethrough for alignment with the ports when the valve is open, means carried by the valve body and engaging the larger end of the turning plug for exerting pressure on said plug and holding it against the seat, a valve stem carried by the turning plug and extending through the stem receiving opening, an elongated valve wrench pivotally connected adjacent one end to the valve stem for movement about an axis which lies perpendicular to the axis of the valve, an arcuate stop plate carried by the valve body and extending outwardly therefrom in concentric spaced relation to the valve stem, said plate having an elongated peripheral slot extending therethrough, a tongue carried by the valve wrench and extending outwardly therefrom in perpendicular relation to the pivotal connection of the wrench and valve stem, and said tongue extending through the slot in the stop plate whereby upon exerting pressure on the valve wrench in the direction of the valve body the wrench will move toward the valve body and move the turning plug longitudinally of the seat against the yielding pressure exerted thereon.

BENJAMIN FRANK WALDRON.

REFERENCES CITED

The following references are of record in the file of this patent:

UNITED STATES PATENTS

| Number | Name | Date |
|---|---|---|
| 1,120,594 | Carbis | Dec. 8, 1914 |
| 1,835,379 | Croslen | Dec. 8, 1931 |
| 1,891,759 | Flodin | Dec. 20, 1932 |
| 2,209,992 | McGill | Aug. 6, 1940 |

FOREIGN PATENTS

| Number | Country | Date |
|---|---|---|
| 117,575 | Sweden | Nov. 5, 1946 |
| 626,800 | France | Sept. 19, 1927 |